United States Patent
Yamada

(10) Patent No.: US 10,855,903 B2
(45) Date of Patent: *Dec. 1, 2020

(54) IMAGE PROCESSING APPARATUS, IMAGE CAPTURING APPARATUS, CONTROL METHOD AND RECORDING MEDIUM

(71) Applicant: CANON KABUSHIKI KAISHA, Tokyo (JP)

(72) Inventor: Satoshi Yamada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,895

(22) Filed: Mar. 7, 2017

(65) Prior Publication Data

US 2017/0180630 A1  Jun. 22, 2017

Related U.S. Application Data

(63) Continuation of application No. 14/168,441, filed on Jan. 30, 2014, now Pat. No. 9,615,016.

(30) Foreign Application Priority Data

Feb. 7, 2013  (JP) ................................. 2013-022643

(51) Int. Cl.
*H04N 5/232* (2006.01)
*H04N 5/235* (2006.01)
(Continued)

(52) U.S. Cl.
CPC .......... *H04N 5/23212* (2013.01); *G02B 7/34* (2013.01); *G03B 13/36* (2013.01); *G06T 5/50* (2013.01);
(Continued)

(58) Field of Classification Search
CPC ............ H04N 5/23212; H04N 5/2356; H04N 5/23293; H04N 5/23216; H04N 13/0282;
(Continued)

(56) References Cited

U.S. PATENT DOCUMENTS

2008/0131019 A1* 6/2008 Ng ............................ G06T 5/50
382/255
2010/0128145 A1* 5/2010 Pitts .................... H04N 5/23212
348/231.99
2010/0128163 A1* 5/2010 Nagasaka .......... H04N 5/23212
348/348

FOREIGN PATENT DOCUMENTS

JP  2005-117531 A  4/2005
JP    3678160 B2   8/2005
(Continued)

OTHER PUBLICATIONS

The above foreign patent documents were cited in a Jun. 28, 2017 Chinese Office Action, a copy of which is enclosed with an English Translation, that issued in Chinese Patent Application No. 201410044919.0.

*Primary Examiner* — Shahbaz Nazrul
(74) *Attorney, Agent, or Firm* — Cowan, Liebowitz & Latman, P.C.

(57) ABSTRACT

In an image processing apparatus of the present invention, multiple subjects are selected in an image signal, and subject distances for focusing on each of the selected subjects are specified. A subject distance range defined by the specified subject distances is then set. Then, based on the image signal, the image processing apparatus generates a reconstructed image that is focused on each of the subjects that are to be focused on in the set subject distance range.

27 Claims, 8 Drawing Sheets

(51) Int. Cl.
*G03B 13/36* (2006.01)
*G06T 5/50* (2006.01)
*G02B 7/34* (2006.01)

(52) U.S. Cl.
CPC ....... *H04N 5/2356* (2013.01); *H04N 5/23216* (2013.01); *H04N 5/23293* (2013.01)

(58) Field of Classification Search
CPC .... G02B 7/34; G02B 7/09; G02B 7/28; G06T 5/50; G06T 2200/21; G03B 13/36
See application file for complete search history.

(56) References Cited

FOREIGN PATENT DOCUMENTS

| JP | 2008-294741 A | 12/2008 |
| WO | 2013/015436 A1 | 1/2013 |

* cited by examiner

FIRST SUBJECT AREA

INTERMEDIATE SUBJECT AREA

SECOND SUBJECT AREA

OUTPUT IMAGE

IMAGE PROCESSING APPARATUS, IMAGE CAPTURING APPARATUS, CONTROL METHOD AND RECORDING MEDIUM

CROSS-REFERENCE TO RELATED APPLICATION

This application is a continuation of application Ser. No. 14/168,441, filed Jan. 30, 2014, the entire disclosure of which is hereby incorporated by reference.

BACKGROUND OF THE INVENTION

Field of the Invention

The present invention relates to an image processing apparatus, an image capturing apparatus, a control method, and a recording medium, and particularly to a technique for generating an image that is focused at an arbitrary subject distance based on output data after shooting.

Description of the Related Art

In recent years, a technique has been proposed in which, in image capturing apparatuses such as digital cameras, an intensity distribution and traveling directions of light is recorded as output data during shooting so as to make it possible to generate an image, in which a focus position is positioned on an arbitrary image plane, based on the output data after recording.

Ren. Ng et al., "Light Field Photography with a Hand-held Plenoptic Camera", Stanford University Computer Science Tech Report CTSR, 2005-02 discloses a method (Light Field Photography) in which light that is incident from various directions is recorded separately by causing light beams that pass through different divided pupil regions of an imaging lens to form images on the pixels (photoelectric conversion elements) of an image sensor via a microlens array. In the output data obtained in this way (light field data, which is hereinafter referred to as "LF data"), adjacent pixels record light beams that were incident from different directions.

By extracting light beams from the same direction from the pixels associated with each microlens, it is possible to generate an image captured from that direction based on the LF data. Also, by setting a focus position and adding up the output of the pixels that recorded the light beams that passed through one point in the focal plane which includes the focus position, it is possible to virtually generate (reconstruct) pixels for an image that is focused at a specified focus position (an image plane) after shooting.

Also, by using only pixels that received light beams that passed through a limited range of divided pupil regions in the LF data, it is possible to obtain an effect equivalent to the case where an aperture is applied in the imaging optical system. Specifically, by generating a reconstructed image using only pixels that correspond to divided pupil regions that correspond to the center of the exit pupil, it is also possible to generate an image that has a deep depth of field and is focused at a wide range of subject distances.

However, when a reconstructed image having a deep depth of field is generated as described above, there are cases where a subject other than the desired subject is also focused on. For example, a passerby or the like who is passing in front of or behind the person who is the desired subject can possibly be in-focus. In particular, a subject that is located closer to the image capturing apparatus during shooting than the desired subject is will have a greater presence in the reconstructed image.

SUMMARY OF THE INVENTION

The present invention was made in view of such problems in the conventional technique. The present invention provides an image processing apparatus, an image capturing apparatus, a control method, and a recording medium for generating an image that is favorably focused on multiple desired subjects.

The present invention in its first aspect provides an image processing apparatus comprising: an obtaining unit which is able to obtain data from which reconstructed images which are focused on arbitrary image planes are able to generate; a display unit which is able to display images to a display medium; a selection unit which is able to select a plurality of subjects on a image displayed by the display unit; a setting unit which is able to specify focus positions corresponding to the plurality of subjects selected by the selection unit and set a focus range defined by the specified focus positions; and a generation unit which is able to generate, based on the data, a reconstructed image in which each subject corresponding to the focus range set by the setting unit is focused.

The present invention in its second aspect provides an image capturing apparatus comprising: an imaging unit which is able to output data from which reconstructed images which are focused on arbitrary image planes are able to generate; a display unit which is able to display images to a display medium; a selection unit which is able to select a plurality of subjects on a image displayed by the display unit; a setting unit which is able to specify focus positions corresponding to the plurality of subjects selected by the selection unit and set a focus range defined by the specified focus positions; and a generation unit which is able to generate, based on the data, a reconstructed image in which each subject corresponding to the focus range set by the setting unit is focused.

The present invention in its third aspect provides a control method of an image processing apparatus, comprising: an obtaining step in which an obtaining unit of the image processing apparatus obtains data from which reconstructed images which are focused on arbitrary image planes are able to generate; a display step in which a display unit of the image processing apparatus displays images to a display medium; a selection step in which a selection unit of the image processing apparatus selects a plurality of subjects on a image displayed in the display step; a setting step in which a setting unit of the image processing apparatus specifies focus positions corresponding to the plurality of subjects selected in the selection step and set a focus range defined by the specified focus positions; and a generation step in which a generation unit of the image processing apparatus generates, based on the data, a reconstructed image in which each subject corresponding to the focus range set in the setting step is focused.

The present invention in its fourth aspect provides a control method of an image capturing apparatus, comprising: an imaging step in which an imaging unit of the image capturing apparatus outputs data from which reconstructed images which are focused on arbitrary image planes are able to generate; a display step in which a display unit of the image capturing apparatus displays images to a display medium; a selection step in which a selection unit of the image capturing apparatus selects a plurality of subjects on a image displayed in the display step; a setting step in which a setting unit of the image capturing apparatus specifies focus positions corresponding to the plurality of subjects selected in the selection step and set a focus range defined by the specified focus positions; and a generation step in which a generation unit of the image capturing apparatus generates, based on the data, a reconstructed image in which each subject corresponding to the focus range set in the setting step is focused.

Further features of the present invention will become apparent from the following description of exemplary embodiments with reference to the attached drawings.

DESCRIPTION OF THE EMBODIMENTS

Hereinafter, an illustrative embodiment of the present invention will be described in detail with reference to the drawings. Note that the following embodiment is described taking the example in which the present invention is applied to a digital camera that can generate an image that is focused on a subject positioned at an arbitrary subject distance based on LF data after shooting, as one example of an image processing apparatus. However, the present invention is applicable to any device that can generate an image that is focused on a subject positioned at an arbitrary subject distance based on LF data.

Also, the following terms used in the present specification are defined as follows.

"Light Field (LF) Data"

LF data refers to an image signal that is output from an imaging unit 106 of the digital camera 100 of the present embodiment. The pixels of the image signal indicate signal intensities that correspond to light beams having different combinations of an incident direction and a pupil region of an imaging optical system 104 through which the light beam passed. LF data is also sometimes called "ray space information".

"Reconstructed Image"

A reconstructed image is an image that is generated from LF data and is focused on a subject positioned at an arbitrary subject distance. Specifically, the pixel values of the pixels in the focal plane that corresponds to the subject distance at which the image is to be generated (i.e., the pixels in a reconstruction plane) are obtained by combining the pixel values of the pixels in the LF data that correspond to the light beams that passed through those pixels in accordance with the pixel arrangement in the focal plane. The pixel arrangement in the reconstruction plane is determined based on the incident directions of the light beams that would be incident if the image sensor were located in the reconstruction plane. One pixel in the reconstructed image can be generated by obtaining the sum of the pixel values of the pixels that correspond to one microlens in the pixel arrangement.

Configuration of Digital Camera 100

Figure 1:
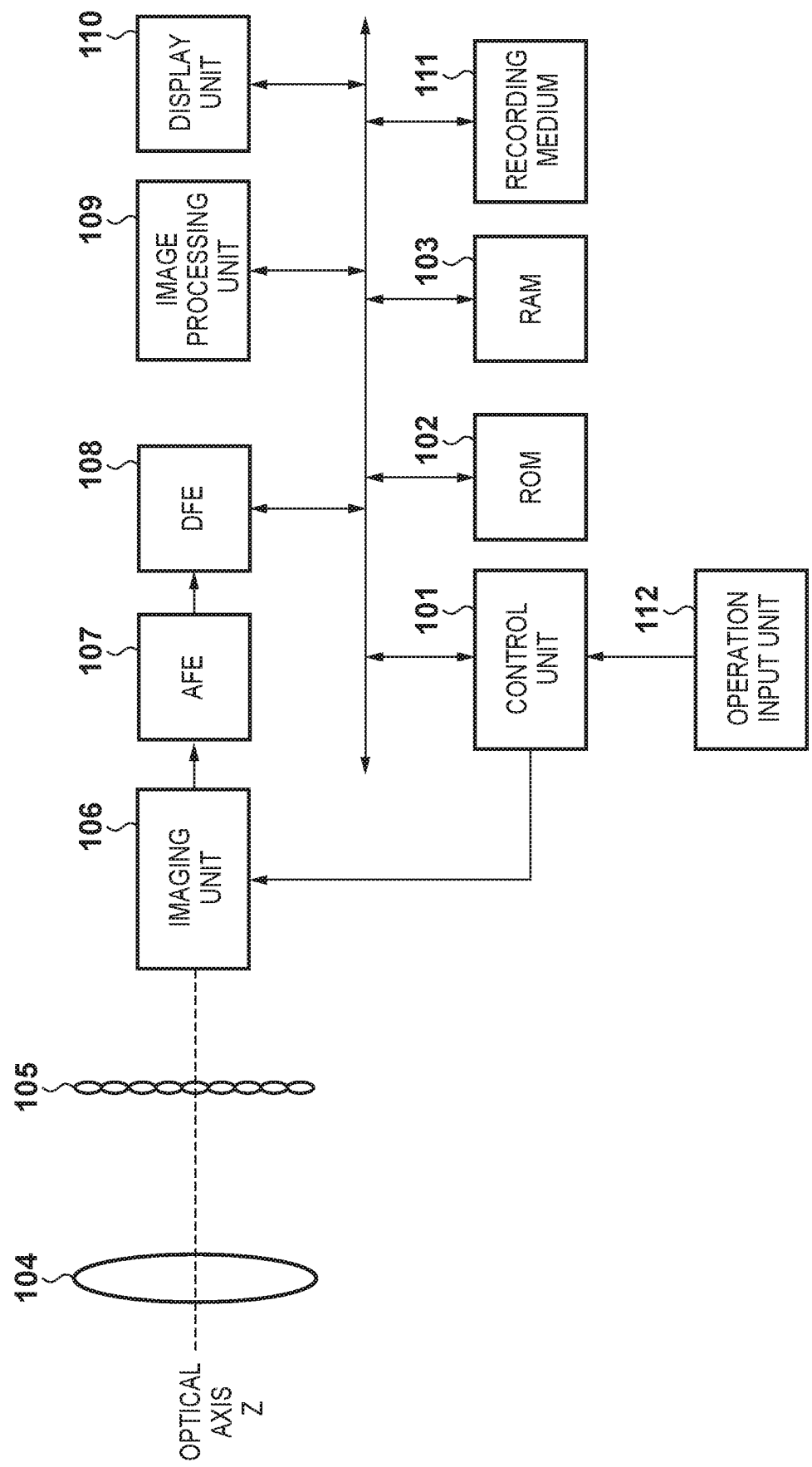
FIG. 1 is a block diagram showing a functional configuration of a digital camera 100 according to an embodiment of the present invention.

FIG. 1 is a block diagram showing the functional configuration of the digital camera 100 according to the present embodiment of the present invention.

A control unit 101 is a CPU, for example, and controls operations of various blocks of the digital camera 100. Specifically, the control unit 101 controls operations of the blocks by reading out an operation program for later-described shooting processing or refocused moving image generation processing that is stored in a ROM 102, deploying it to a RAM 103, and executing it.

The ROM 102 is a rewritable nonvolatile memory, for example, and stores operation programs for blocks of the digital camera 100, as well as parameters necessary for operations of the blocks, and the like.

The RAM 103 is a volatile memory. The RAM 103 is used not only as an area for deployment of operation programs for blocks of the digital camera 100, but also as a storage area for storing intermediate data output in operations of the blocks, and the like.

The imaging unit 106 is an image sensor such as a CCD or a CMOS sensor. The imaging unit 106 receives a timing signal that is output from a timing generator (TG) (not shown) in accordance with an instruction from the control unit 101, performs photoelectric conversion on an optical image that was formed on the photoelectric conversion element face of the image sensor by an imaging optical system 104, and outputs an analog image signal. Note that the imaging optical system 104 includes an objective lens, a focusing lens, a diaphragm, and the like. Also, the digital camera 100 of the present embodiment has microlenses that are provided on the photoelectric conversion elements of the image sensor, and also separately has a microlens array 105 between the image sensor and the imaging optical system 104 on the optical axis.

Relationship Between Microlenses and Photoelectric Conversion Elements

The following describes the microlens array 105 that is provided between the image sensor and the imaging optical system 104 on the optical axis in the digital camera 100 of the present embodiment, with reference to the drawings.

Figure 2:
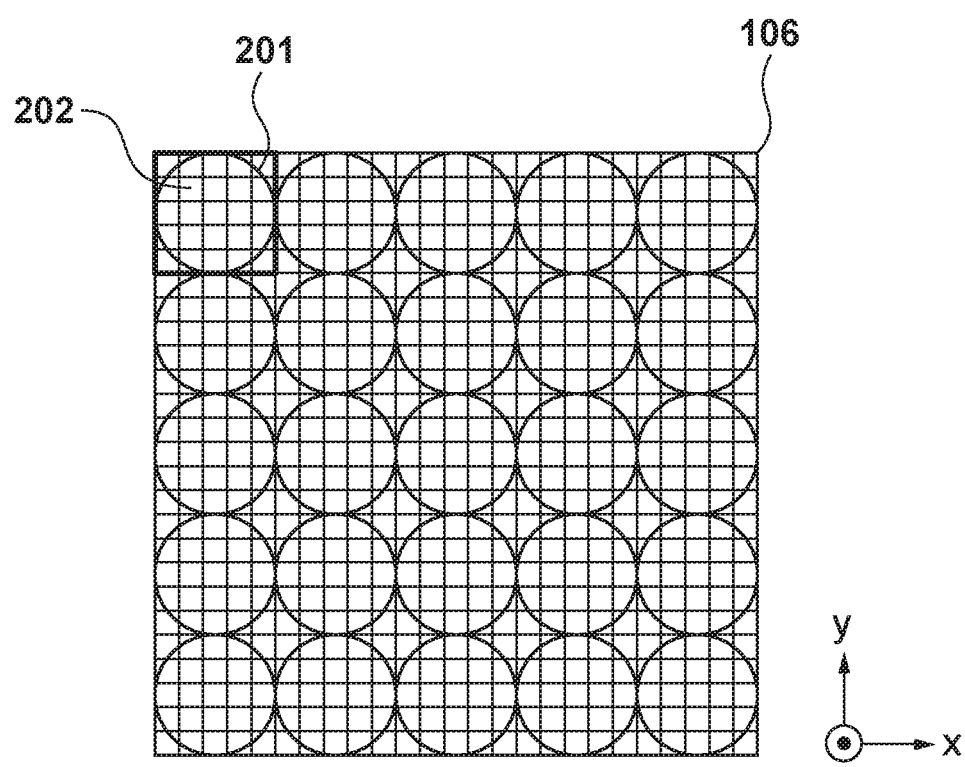
FIG. 2 is a diagram for describing the relationship between a microlens array 105 and an imaging unit 106 according to the embodiment of the present invention.

As shown in FIG. 2, the microlens array 105 of the present embodiment is constituted by multiple microlenses 201. In FIG. 2, the z axis is the optical axis of the imaging optical system 104, the x axis is the horizontal direction when the digital camera 100 is in the landscape orientation, and the y axis is the vertical direction. Note that for the sake of simplicity in the example shown in FIG. 2, the microlens array 105 will be described as being constituted by microlenses 201 arranged in five rows and five columns, but the configuration of the microlens array 105 is not limited to this.

Also, FIG. 2 shows an example in which photoelectric conversion elements 202 of the image sensor constituting the imaging unit 106 are indicated by a grid. Each microlens 201 corresponds to a predetermined number of photoelectric conversion elements 202, and in the example shown in FIG. 2, one microlens 201 corresponds to the photoelectric conversion elements 202 of 5×5=25 pixels. Light beams that pass through one microlens 201 are separated according to their incident direction, and form an image on the corresponding photoelectric conversion elements 202.

Figure 3:
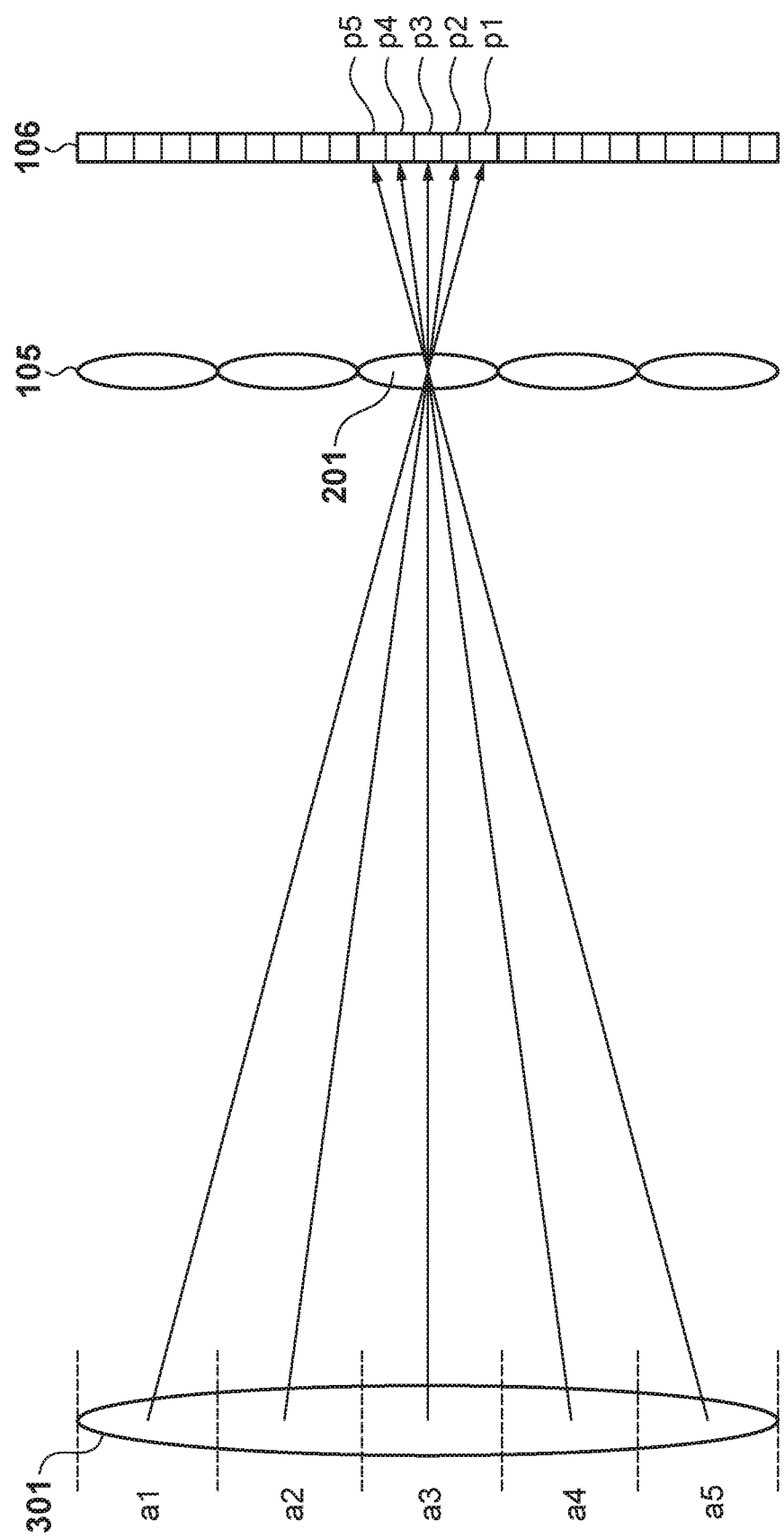
FIG. 3 is a diagram for describing the relationship between light beams that pass through various areas of an exit pupil 301 and photoelectric conversion elements for subjecting the light beams to photoelectric conversion according to the embodiment of the present invention.

FIG. 3 shows light beams that are incident on photoelectric conversion elements 202 $p_1$ to $p_5$ that correspond to one microlens 201. In FIG. 3, the upward direction corresponds to the vertically upward direction. This figure illustrates the light paths of light beams that are incident on the photoelectric conversion elements 202 as viewed laterally when the digital camera 100 is in the landscape orientation. As shown in this figure, the light beams that are incident on the horizontally-aligned photoelectric conversion elements 202 $p_1$ to $p_5$ are light beams that passed through five areas $a_1$ to $a_5$ obtained by dividing an exit pupil 301 of the imaging optical system 104 vertically, and then passed through one microlens 201. Note that the numbers appended to the areas indicate the correspondence relationship with the photoelectric conversion elements 202 that receive the light beams that passed through those areas.

Figure 4A:
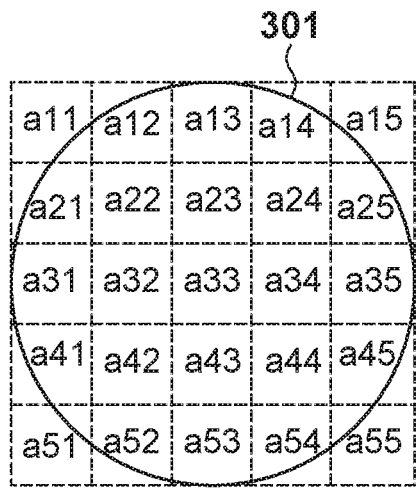
FIGS. 4A and 4B are diagrams showing the correspondence between areas of the exit pupil 301 and photoelectric conversion elements that correspond to microlenses according to the embodiment of the present invention.

Note that although FIG. 3 shows an example of light paths of light beams that are incident on the photoelectric conversion elements 202 as viewed laterally, the separation of light beams is not limited to the vertical direction, and separation is similarly performed in the horizontal direction as well. Specifically, in the case where the exit pupil 301 of the imaging optical system 104 is divided into the areas shown in FIG. 4A as viewed from the image sensor side, light beams that pass through the various areas are incident on the photoelectric conversion elements that are appended with the same identification number among the photoelectric conversion elements 202 shown in FIG. 4B. Note that it is assumed here that the imaging optical system 104 and the microlenses in the microlens array 105 have substantially the same F-number (F-value).

An AFE 107 and a DFE 108 perform correction processing and the like on an image signal generated by the imaging unit 106. Specifically, the AFE 107 performs reference level adjustment (clamp processing) and A/D conversion processing on an analog image signal that is output from the imaging unit 106, and outputs LF data to the DFE 108. The DFE 108 corrects minor reference level deviation and the like in the input LF data.

An image processing unit 109 applies various types of image processing such as color conversion processing to LF data that was subjected to correction processing by the DFE 108. In the present embodiment, the image processing unit 109 also performs processing for generating an image that is focused on a subject positioned at an arbitrary subject distance (i.e., a reconstructed image) based on LF data. The reconstructed image can be generated using a "Light Field Photography" technique such as the previously-described technique disclosed in Ren.

Reconstructed Image Generation Method

The following describes an overview of a method of generating a reconstructed image that is focused on a subject at a specified subject distance, with reference to the drawings.

First, the subject distance for focusing on a specified subject included in the shooting range can be acquired with the following method. Firstly, the image processing unit 109 generates images respectively corresponding to two light beams that passed through different divided pupil regions from the LF data, and detects the difference (defocus amount) between the images of the specified subject in the images. The control unit 101 can then calculate the subject distance for focusing on the specified subject based on the defocus amount detected in this way.

Figure 4B:
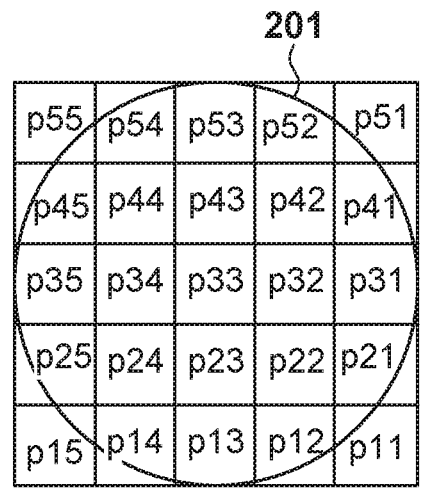

For each microlens in the example shown in FIG. 4B, it is possible to generate an image A that corresponds to divided pupil regions in the left half of the exit pupil 301 by adding up the pixel values of the pixels in the first and second columns among the corresponding pixels. Also, it is possible to generate an image B that corresponds to divided pupil regions in the right half of the exit pupil 301 by adding up the pixel values of the pixels in the fourth and fifth columns among the corresponding pixels. This can be represented by the following expression.

$$\begin{cases} \sum_{a=1}^{5}\sum_{b=1}^{2}(P_{ab}) & \text{left half regions} \\ \sum_{a=1}^{5}\sum_{b=4}^{5}(P_{ab}) & \text{right half regions} \end{cases}$$

The two types of reconstructed images obtained in this way are images for which the optical axis is the barycentric position of the corresponding divided pupil regions.

Specifically, since the two types of reconstructed images have image deviation due to optical axis deviation, it is possible to detect the image deviation amount (pupil division phase difference) for each subject by performing a correlation calculation with respect to the two images. The subject distances for focusing on the subjects included in the shooting range of the LF data can be analyzed based on image deviation amounts obtained in this way, and it is possible to generate a reconstructed image that is focused on a specified subject as an additional image, for example.

The following describes the generation of a reconstructed image that is focused on a subject at a specified subject distance. In the digital camera 100 of the present embodiment, each of the pixels that correspond to one microlens as described above receives a light beam that passed through a different divided pupil region of the exit pupil of the imaging lens. The same follows for all of the microlenses in the microlens array 105. Also, since each microlens receives light beams that passed through the imaging lens from a different direction, every pixel of the image sensor receives light beams that were incident from all of the different directions.

For this reason, the light beams that are incident on the pixels in the LF data obtained by shooting are defined in the following description using a light path indicated by the coordinates (u,v) of the pupil region that was passed through in the exit pupil and the position coordinates (x',y') of the corresponding microlens. In the generation of a reconstructed image, it is possible to obtain the pixel value of a pixel (x,y) in the reconstruction plane that corresponds to the arbitrary subject distance at which the reconstructed image is to be generated, by integrating the light beams that have light paths that pass through that point.

Figure 5:
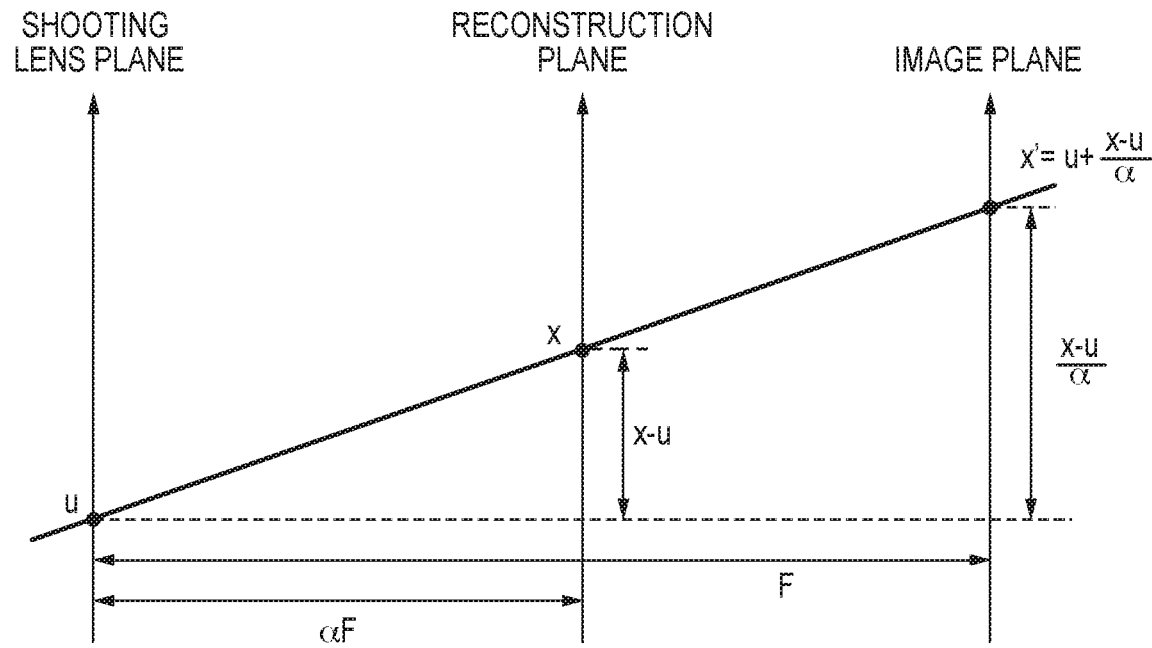
FIG. 5 is a diagram for describing the relationship that light beams that pass through a specified position in a reconstruction plane have with pass-through positions in the imaging plane according to the embodiment of the present invention.

FIG. 5 shows light paths of light beams in the horizontal plane (xz plane) as viewed from the vertical direction when the digital camera 100 is in the landscape orientation. Although the following describes light paths of light beams that pass through pixels in the reconstruction plane in the xz plane, the same follows for the yz plane as well.

Letting (u,v) represent the coordinates of a pupil region, and (x,y) represent the coordinates of a pixel in the reconstruction plane, the following expression obtains the position coordinates (x',y') of the microlens in the microlens array 105 that receives the light beam that passes through that divided pupil region and that pixel in the reconstruction plane.

$$(x', y') = \left(u + \frac{x-u}{\alpha}, v + \frac{y-v}{\alpha}\right)$$

Note that F represents the distance from the imaging lens to the microlens array, and αF represents the distance from the shooting lens to the reconstruction plane (α being a refocusing coefficient, which is a variable coefficient for determining the distance to the reconstruction plane).

Also, letting L(x',y',u,v) represent the output of the photoelectric conversion element that receives this light beam, the output E(x,y) of the pixel at the coordinates (x,y) in the image to be formed in the reconstruction plane is obtained by integrating L(x',y',u,v) with respect to the pupil regions of the shooting lens, as shown by the following expression.

$$E(x, y) = \frac{1}{\alpha^2 F^2} \int\int L\left(u + \frac{x-u}{\alpha}, v + \frac{y-v}{\alpha}, u, v\right) du dv$$

Note that this expression can be solved through simple addition if representative coordinates of the pupil region are set as (u,v).

A display unit 110 is a display device such as a compact LCD that the digital camera 100 has. The display unit 110 displays an image that was generated by the image processing unit 109 and is focused at an arbitrary subject distance. As described above, in the LF data obtained by performing A/D conversion on an analog image signal output from the imaging unit 106 of the present embodiment, images at adjacent pixels are not linked. For this reason, image data generated by the image processing unit 109 is displayed on the display unit 110 rather than the LF data.

A recording medium 111 is, for example, an internal memory of the digital camera 100, or a removable recording device such as a memory card or an HDD that is connected to the digital camera 100. The recording medium 111 records LF data as well as images that have been generated from the LF data and are focused at arbitrary image planes.

An operation input unit 112 is a user interface of the digital camera 100 such as a power button, a shutter button, or the like. Upon detecting that the user interface was operated by the user, the operation input unit 112 outputs a control signal that corresponds to detected operation to the control unit 101.

Reconstructed Image Generation Processing

Figure 6:
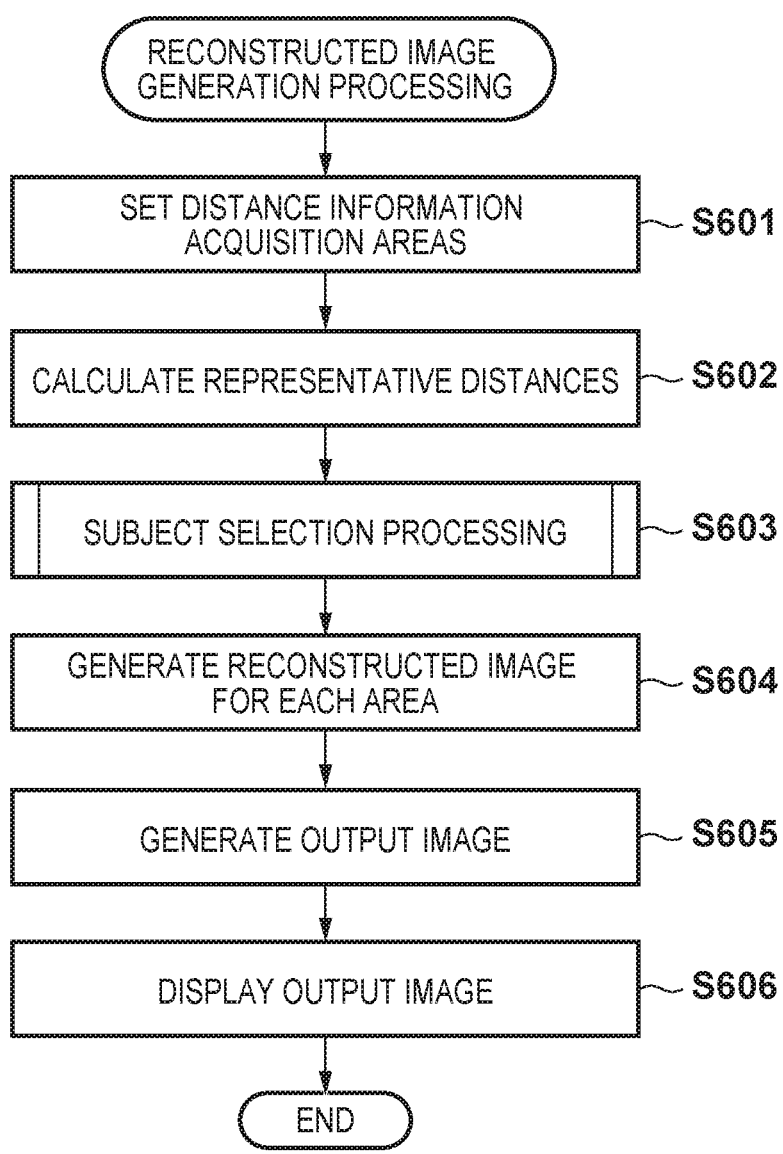
FIG. 6 is a flowchart illustrating reconstructed image generation processing that is executed in the digital camera 100 according to the embodiment of the present invention.

The following is a specific description of processing in the reconstructed image generation processing executed in the digital camera 100 of the present embodiment having the above-described configuration, with reference to the flowchart of FIG. 6. Processing corresponding to this flowchart can be realized by the control unit 101 reading out a corresponding processing program stored in the ROM 102, deploying it to the RAM 103, and executing it, for example. Note that the reconstructed image generation processing will be described as processing that is started when the digital camera 100 is set to the browsing mode and started up, and then the user gives an instruction to generate a reconstructed image from LF data recorded on the recording medium 111, for example.

In step S601, the control unit 101 sets distance information acquisition areas (referred to hereinafter as "D areas") for acquiring corresponding pieces of information indicating the distances to subjects from the target LF data for which the generation instruction was given. A D area is a two-dimensional area in the pixel array constituting the target LF data, and is defined in units of the group of pixels (photoelectric conversion elements 202) that corresponds to one microlens 201. Specifically, the size of the D area is defined according to the minimum resolution of the reconstructed image that can be generated from the LF data. For example, in the example shown in FIG. 2, the group of 5×5 pixels that corresponds to one microlens 201 corresponds to the minimum reconstructed image resolution, and therefore the D area is defined as an area whose number of pixels in the horizontal direction is a multiple of 5, and whose number of pixels in the vertical direction is a multiple of 5.

Note that a configuration is possible in which the D area is defined in units of the group of pixels that corresponds to the minimum resolution of the reconstructed image that can be generated from the target LF data, and the size of the D area is set to an appropriate size according to the precision required for the distance to a subject, and limitations such as the device computing power, the calculation amount, and the required frame rate.

In step S602, for each of the D areas that were set in step S601, the control unit 101 calculates information indicating a representative distance to subjects included in the area. Specifically, for each of the D areas of the target LF data, the control unit 101 causes the image processing unit 109 to generate two types of reconstructed images for defocus amount detection (detection images) that correspond to light beams that passed through two different divided pupil regions. The detection images that are generated in this step may correspond to light beams that passed through divided pupil regions obtained by dividing the region of the exit pupil 301 into left-half and right-half divided pupil regions as previously described. However, the implementation of the present invention is not limited to this; it is only necessary that the detection images are two types of images that correspond to, from among the light beams that passed through the exit pupil 301, light beams that passed through two types of divided pupil regions that have different optical axes, and the method of selecting divided pupil regions is not limited to this.

The control unit 101 then calculates a representative distance for each D area in accordance with the result of analyzing the obtained defocus amounts. Note that the representative distance may be the distance related to the subject located in the center of the corresponding D area, or may be an average value of distances obtained for all of the subjects in the corresponding area, for example.

In step S603, the control unit 101 executes subject selection processing for allowing the user to select subjects (in-focus subjects) that are to be focused on in the reconstructed image that is ultimately generated (i.e., the final image).

Subject Selection Processing

Figure 7:
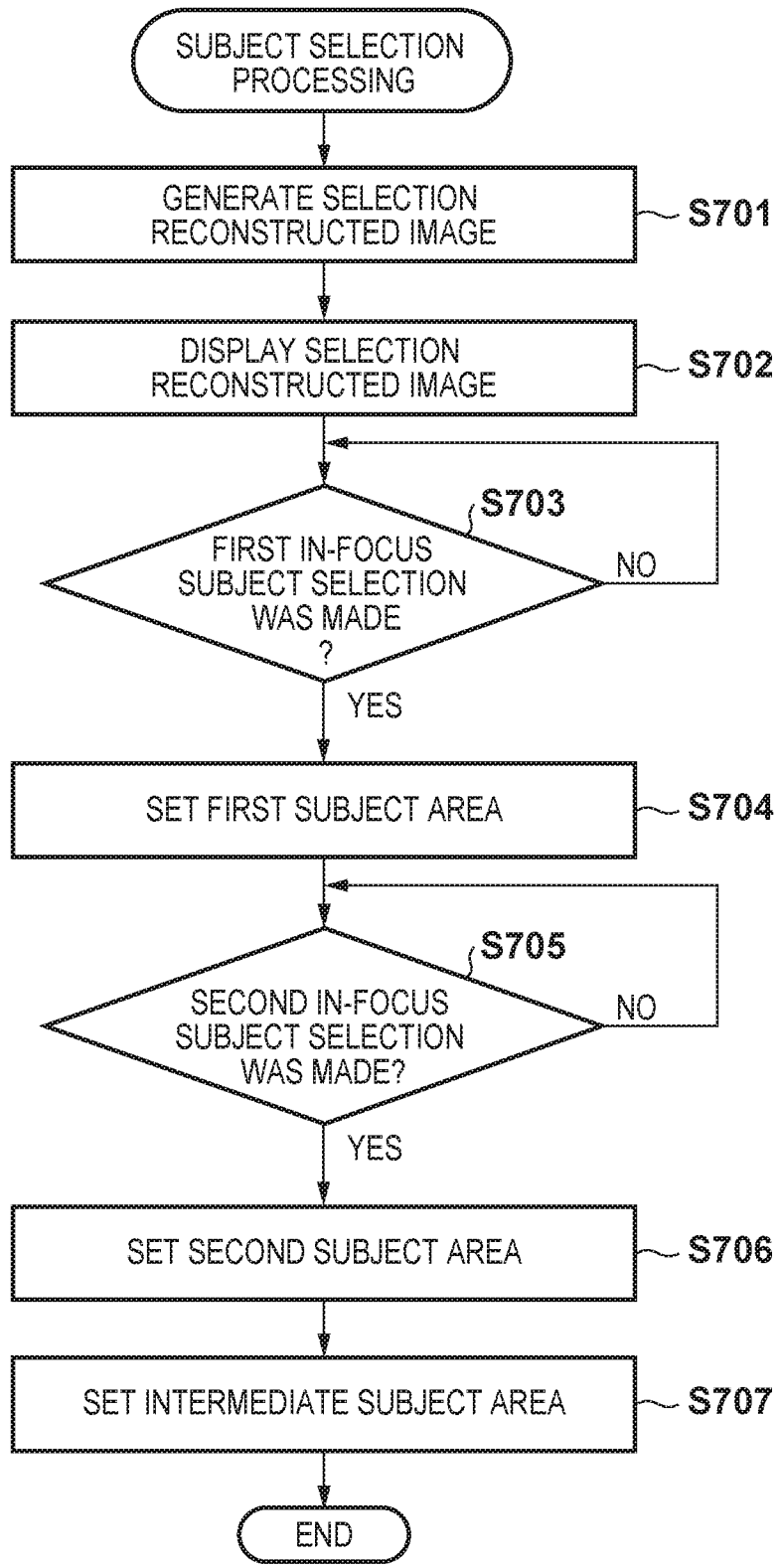
FIG. 7 is a flowchart illustrating subject selection processing that is executed in the digital camera 100 according to the embodiment of the present invention.

The following describes details of the subject selection processing executed in step S603 with reference to the flowchart of FIG. 7.

In step S701, under control of the control unit 101, the image processing unit 109 generates a selection reconstructed image for allowing the user to designate in-focus subjects that are to be focused on in the final image. The selection reconstructed image may be an image generated so as to be focused at the subject distance (an image plane) that was set when the target LF data was obtained, for example.

Alternatively, in order for the subjects to be recognized easily, the selection reconstructed image may be an image with a deep depth of field that is generated using pixels that correspond to the light beams that passed through a limited range of divided pupil regions, such as the central portion of the exit pupil 301.

In step S702, the control unit 101 transmits the selection reconstructed image that was generated by the image processing unit 109 to the display unit 110, and causes it to be displayed along with a message instructing the user to select in-focus subjects. The display unit 110 of the present embodiment may be a touch panel display that includes a sensor for detecting touch operations, for example, and the user may be allowed to select in-focus subjects by performing touch operations on the selection reconstructed image displayed on the display unit 110. When a touch operation is performed, a touch operation detection signal is transmitted to the operation input unit 112, and the operation input unit 112 converts the detection signal into a control signal and outputs the control signal to the control unit 101.

In step S703, the control unit 101 determines whether or not a first in-focus subject selection was made. In the present embodiment, it is assumed that the digital camera 100 has a function of detecting areas that correspond to people's faces included in images, and it is assumed that in step S703, it is determined whether or not the user selected a face area that is to be the in-focus subject. Note that the in-focus subject is not limited to being a person's face area, and it may be a specified subject that the digital camera 100 has a detection function for. Also, although the in-focus subject is described as being a person's face area in the present embodiment, the implementation of the present invention is not limited to this, and a subject such as a building located at a position designated by the user may be set as the in-focus subject.

If the control unit 101 determines that a first in-focus subject selection was made, the procedure moves to step S704, and if it determines that a first in-focus subject selection has not been made, the processing of step S703 is repeated.

In step S704, D areas that correspond to the subject distance at one end in the subject distance range that is to be in-focus in the output image are set as the first subject area by the control unit 101. Specifically, the control unit 101 specifies information indicating the representative distance of the D area that corresponds to the position in the selection reconstructed image where the face area that is the selected in-focus subject is located, and sets the D areas that have the same representative distance information as the first subject area.

In step S705, the control unit 101 determines whether or not a second in-focus subject selection was made. If the control unit 101 determines that a second in-focus subject selection was made, the procedure moves to step S706, and if it determines that a second in-focus subject selection has not been made, the processing of step S705 is repeated.

In step S706, D areas that correspond to the subject distance at the other end in the subject distance range that is to be in-focus in the output image are set as the second subject area by the control unit 101. Specifically, the control unit 101 specifies information indicating the representative distance of the D area that corresponds to the position in the selection reconstructed image where the face area that is the in-focus subject that was selected the second time is located, and sets the D areas that has the same representative distance information as the second subject area.

In step S707, the control unit 101 determines whether or not an intermediate subject is included in the subject distance range that was set; if an intermediate subject is included, the control unit 101 sets D areas that correspond to the subject distance of the intermediate subject as the intermediate subject area, and then subject selection processing is completed. Specifically, for each of the face areas included in the subject distance range, the control unit 101 specifies information indicating the representative distance of the D area that corresponds to that position in the selection reconstructed image, and sets the D areas that have the same representative distance information as the intermediate subject area.

Figure 8A:
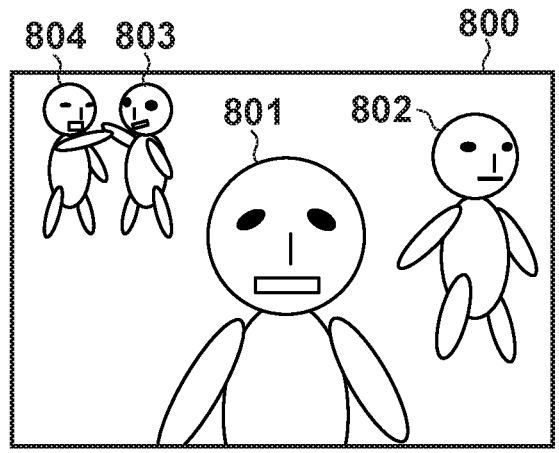
FIGS. 8A and 8B are diagrams for describing target LF data according to the embodiment of the present invention.
Figure 9:
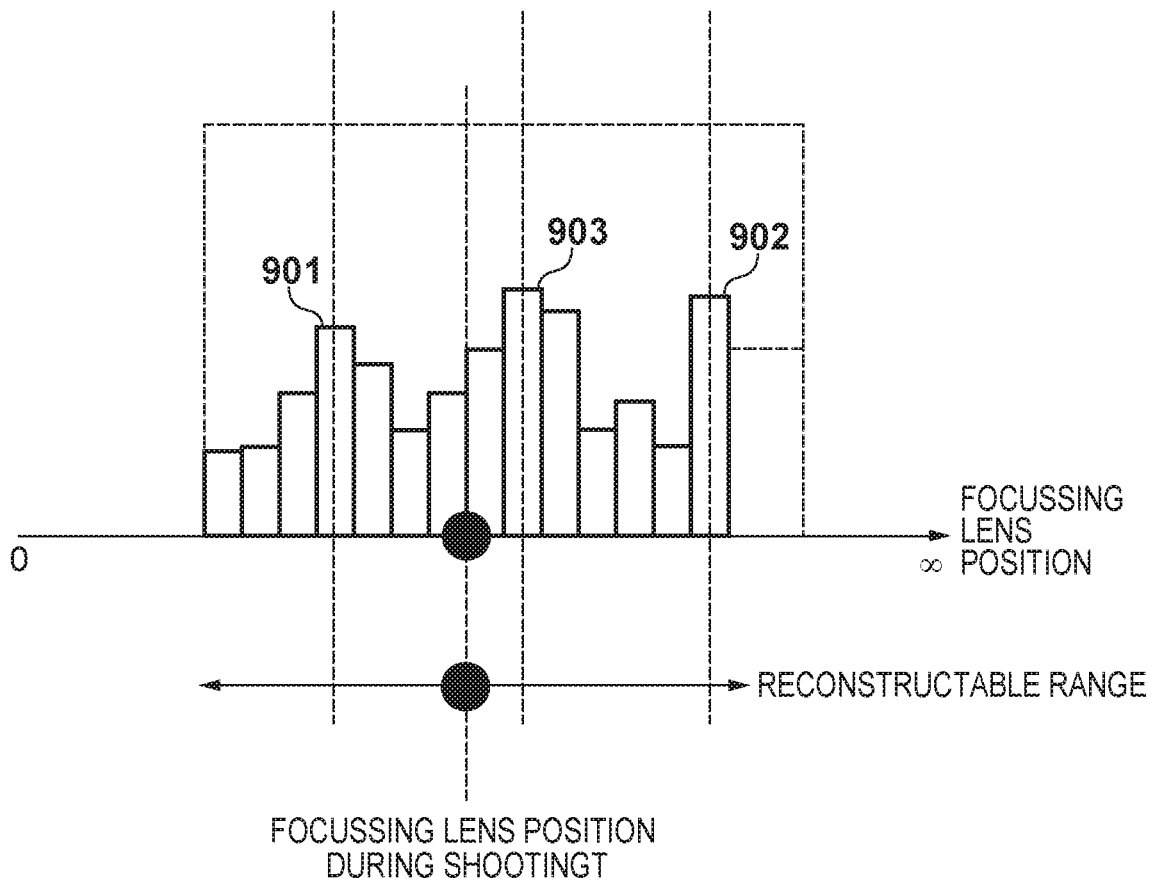
FIG. 9 is a histogram showing a distribution for a D area according to the embodiment of the present invention.

For example, consider the case where the selection reconstructed image is the image shown in FIG. 8A. A selection reconstructed image 800 includes a subject 801, a subject 802, and subjects 803 and 804 in order of increasing distance from the digital camera 100. The distribution of representative distances here can be shown as a histogram for subject distances for focusing on subjects, as shown in FIG. 9.

Figure 8B:
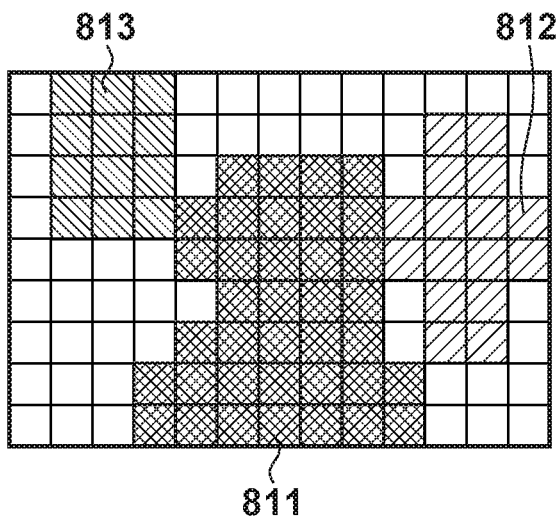

Assume that the subject 801 was selected as the first in-focus subject, and the subject 803 was selected as the second in-focus subject. Here, the subject distance range that is to be in-focus in the output image is from 901 in FIG. 9 where the number of D areas that include the face area of the subject 801 is counted, to 902 where the number of D areas that include the face area of the subject 803 (and subject 804) is counted. In the present embodiment, from among the D areas included in this subject distance range, for each D area that includes a person's face area and each D area that has the same representative distance as that D area, an image generated so as to be focused at the corresponding subject distance is used in output image generation. In the example shown in FIG. 8A, the subject 802 is an intermediate subject that is between the subject 801 and the subject 803. For this reason, for each D area that has the same representative distance as the D areas that include the subjects 801, 802, 803, and 804, the pixel group that was generated so as to be focused at the subject distance that corresponds to the representative distance is used as pixels in the reconstructed image that is to be output. Specifically, in the example shown in FIG. 8A, the groups of D areas that have different cross-hatching according to the representative distances of the various areas as shown in FIG. 8B are areas that are to be used in the generation of images of subjects to be focused on in the output image. In FIG. 8B, an area 811 corresponds to the group of areas 901 (first subject area) in FIG. 9 where the number of D areas that include the face area of the subject 801 is counted. Also, an area 812 corresponds to the group of areas 903 (intermediate subject area) in FIG. 9 where the number of D areas that include the face area of the subject 802 is counted. Furthermore, an area 813 corresponds to the group of areas 902 (second subject area) in FIG. 9 where the number of D areas that include the face areas of the subjects 803 and 804 is counted.

In this way, by executing the subject selection processing, it is possible for the user to select subjects that are to be focused on in the output image with an easy operation. In other words, even with LF data obtained when shooting a scene that includes a large number of subjects that are to be focused on, it is possible to easily select desired subjects.

Note that in the present embodiment, it has been described that two types of subjects are selected, and then the range enclosed by the subject distances of the two subjects that are to be focused on is set as the subject distance range that is to be in-focus in the output image. However, the implementation of the present invention is not limited to this, and the subject distance range may be set using another method. For example, a configuration is possible in which subject distance ranges that are not to be in-focus are set by the selection of the subject 803 in FIG. 8A and infinity (the background or far end) and the selection of the subject 801 and the foreground (near end), and then the range not included in those ranges is set as the subject distance range that is to be in-focus. Also, a configuration is possible in which the subject 801 and the subject 803 are selected, thereafter the subject 802 is selected as a subject that is to be excluded from being an intermediate subject, and the divided ranges are set as the subject distance ranges that are to be in-focus. In other words, it is sufficient that a range defined by the subject distances for focusing on at least two selected subjects is set as the subject distance range that is to be in-focus.

After the subject distance range that is to be in-focus in the output image is set by executing the subject selection processing in this way, the control unit 101 moves to the processing of step S604.

Figure 10A:
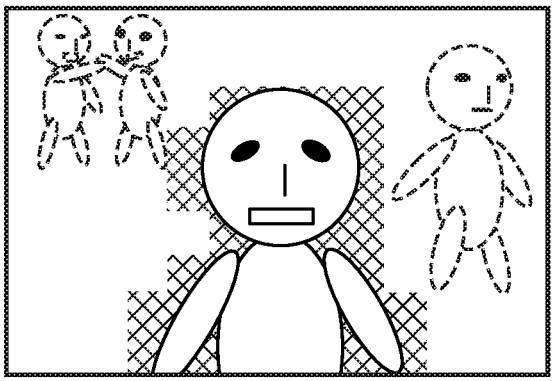
FIGS. 10A, 10B, 10C, and 10D are diagrams for describing the generation of an output image according to the embodiment of the present invention.
Figure 10B:
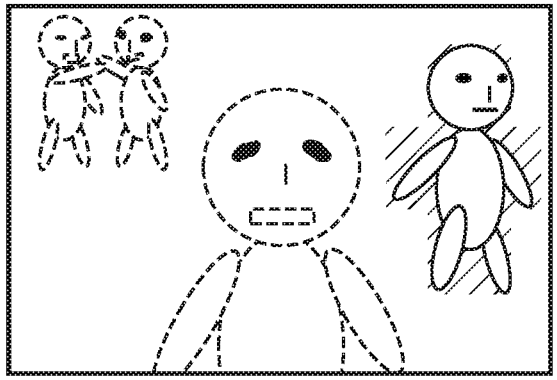
Figure 10C:
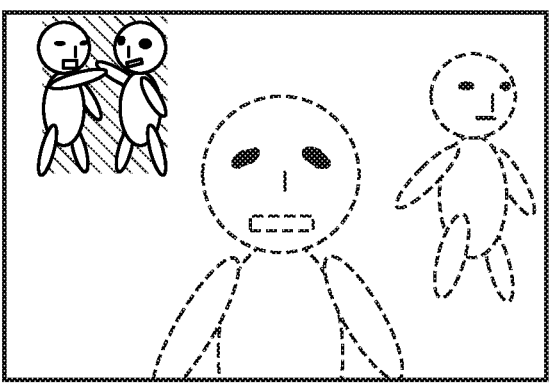

In step S604, under control of the control unit 101, for each of the first, second, and intermediate subject areas included in the subject distance range, the image processing unit 109 generates a reconstructed image that is focused at the subject distance that corresponds to the area. In the case where the subject distance range described above with reference to FIG. 8A has been set, reconstructed images that are focused at the subject distances corresponding to the areas shown in FIGS. 10A to 100 are generated.

Also, the image processing unit 109 generates a reconstructed image that is focused at a specified subject distance for an area not included in the subject distance range. This specified subject distance may be the subject distance that was set in the imaging optical system 104 during shooting, for example. Also, from the viewpoint of making the subjects included in the subject distance range prominent in the output image, it is preferable that the specified subject distance that is selected is different from the subject distances of the subjects that are to be focused on in the subject distance range, such as a subject distance that is not included in the subject distance range that was set.

Note that in the case of a D area in the vicinity of a boundary between areas, in order to mitigate discontinuity after the combining in the next step S605, a reconstructed image may be generated for the subject distance that corresponds to a representative distance in the vicinity of the intermediate value of the representative distances of two D areas.

Figure 10D:
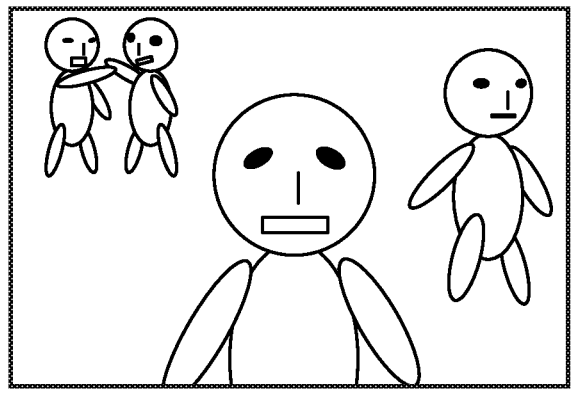

In step S605, under control of the control unit 101, the image processing unit 109 combines the reconstructed images for the various areas that were generated in step S604, and generates an output image. Specifically, the image processing unit 109 performs combining such that pixels of the reconstructed images generated as shown in FIGS. 10A to 100 are used as pixels of corresponding areas in the output image, and thus the output image (FIG. 10D) is generated.

In step S606, the control unit 101 transmits the generated output image to the display unit 110 and causes it to be displayed, and thus reconstructed image generation processing is completed.

Note that it is described in the present embodiment that for each subject included in the subject distance range set by two in-focus subject selections, a reconstructed image that is focused on that subject is generated, and then the generated reconstructed images are combined. However, the implementation of the present invention is not limited to this. For example, if there is a large difference in the subject distances for focusing on the selected in-focus subjects, and an output image is generated so as to not be in-focus in areas that do not include the selected subjects, it is possible for the output image to be an image in which the focus has been adjusted unnaturally. In such a case, a configuration is possible in which, if the difference between the subject distances for focusing on the selected in-focus subjects is greater than a predetermined length, the control unit 101 performs control so as to cause the image processing unit 109 to generate an image that has a deep depth of field so as to be widely focused on subjects in the shooting range. In other words, a reconstructed image generated under the condition that a subject not included in the set subject distance range is also to be focused on, may be generated as the output image. As described above, an image having a deep depth of field may be an image generated using, from among the pixels in the LF data, pixels that correspond to light beams that passed through a limited range of divided pupil regions such as the central portion of the exit pupil 301.

As described above, the image processing apparatus of the present embodiment can generate an image that is favorably focused on multiple desired subjects. Specifically, with this image processing apparatus, multiple subjects are selected in an image signal, and subject distances for focusing on each of the multiple selected subjects are specified. A subject distance range defined by the specified subject distances is then set. Then, based on the image signal, the image processing apparatus generates a reconstructed image that is focused on each of the subjects that are to be focused on in the set subject distance range.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-022643, filed Feb. 7, 2013, which is hereby incorporated by reference herein in its entirety.

What is claimed is:

1. An image processing apparatus comprising one or more processors configured to function as:
 a first obtaining unit which is able to obtain data from which images which are focused at a plurality of focus ranges can be generated after shooting and recording the data;
 a second obtaining unit which is able to obtain distance information corresponding to a plurality of areas in the data;
 a setting unit which is able to specify focus positions corresponding to a plurality of subjects included in the data and set a focus range determined by the specified focus positions for focusing the plurality of subjects in an image; and
 a generation unit which is able to generate the image by combining pixel values in the data such that all subjects corresponding to the plurality of areas that the distance information is obtained by the second obtaining unit within the focus range set by the setting unit are focused in the image, and
 wherein the focus range set by the setting unit is defined such that a focus position corresponding to one subject among the plurality of subjects is determined as one end of the focus range and a focus position corresponding to another subject among the plurality of subjects is determined as another end of the focus range.

2. The image processing apparatus according to claim 1, wherein the one or more processors further function as a display unit which is able to display, to a display, images corresponding to the data and images generated by the generation unit.

3. The image processing apparatus according to claim 2, wherein the one or more processors further function as an instruction unit which is able to set the plurality of subjects.

4. The image processing apparatus according to claim 3, wherein
 the display is a touch panel display, and
 the instruction unit sets, as the plurality of subjects, subjects corresponding to operation inputs received on the touch panel display.

5. The image processing apparatus according to claim 4, wherein the generation unit generates an instruction image that is focused on a subject at a predetermined focal position, and
 the instruction unit receives an operation input of each of the plurality of subjects in the instruction image that was generated by the generation unit.

6. The image processing apparatus according to claim 1, wherein the data was captured by an image capturing apparatus and comprises a plurality of viewpoint images.

7. The image processing apparatus according to claim 1, wherein the data was captured by an image capturing apparatus at one time.

8. The image processing apparatus according to claim 1, wherein the data is light field data.

9. The image processing apparatus according to claim 1, wherein the second obtaining unit obtains the distance information by generating, for each of two different divided pupil regions, an image using pixels that correspond to light beams that passed through the same divided pupil region in the data, and analyzing a distance for each subject included in the data based on a difference between the two types of generated images, and
 the setting unit specifies the focus positions for focusing on each of the plurality of subjects with reference to a result of the analysis performed by the second obtaining unit.

10. The image processing apparatus according to claim 1, wherein the generation unit generates the image by combining pixel values in the data in accordance with a pixel arrangement in a focal plane corresponding to the focus range set by the setting unit.

11. The image processing apparatus according to claim 10, wherein the generation unit generates, for a region of each subject not within the focus range included in the image, each pixel by adding pixel values of the data chosen such that a subject of the region is not focused.

12. The image processing apparatus according to claim 1, wherein, in a case where the focus range set by the setting unit is wider than a predetermined range, the generation unit generates the image in which subjects positioned at far end or near end are further focused.

13. The image processing apparatus according to claim 1, wherein the generation unit specifies regions in which the subject in the focus range is captured, and generates the image such that each of the subjects of the regions is focused.

14. An image capturing apparatus comprising one or more processors configured to function as:
 an imaging unit which is able to output data from which images which are focused at a plurality of focus ranges can be generated after shooting and recording the data;
 an obtaining unit which is able to obtain distance information corresponding to a plurality of areas in the data;
 a setting unit which is able to specify focus positions corresponding to a plurality of subjects included in the data and set a focus range determined by the specified focus positions for focusing the plurality of subjects in an image; and
 a generation unit which is able to generate the image by combining pixel values in the data such that all subjects corresponding to the plurality of areas that the distance information is obtained by the obtaining unit within the focus range set by the setting unit are focused in the image, and
 wherein the focus range set by the setting unit is defined such that a focus position corresponding to one subject among the plurality of subjects is determined as one end of the focus range and a focus position corresponding to another subject among the plurality of subjects is determined as another end of the focus range.

15. A control method of an image processing apparatus, the control method comprising:
 obtaining data which was captured by an image capturing apparatus, where each pixel of the data is corresponding to a light beam passed through a divided pupil region of an imaging optical system;
 obtaining distance information corresponding to a plurality of areas in the data;
 specifying focus positions corresponding to a plurality of subjects included in the data and setting a focus range determined by the specified focus positions for focusing the plurality of subjects in an image; and
 generating the image by combining pixel values in the data such that all subjects corresponding to the plurality of areas that the distance information is obtained within the set focus range are focused in the image, and
 wherein the set focus range is defined such that a focus position corresponding to one subject among the plurality of subjects is determined as one end of the set focus range and a focus position corresponding to another subject among the plurality of subjects is determined as another end of the set focus range.

16. A control method of an image capturing apparatus, the control method comprising:
    outputting data from which images which are focused with a plurality of focus ranges can be generated after shooting and recording the data;
    obtaining distance information corresponding to a plurality of areas in the data;
    specifying focus positions corresponding to a plurality of subjects included in the data and setting a focus range defined by the specified focus positions for focusing the plurality of subjects in an image; and
    generating the image by combining pixel values in the data such that all subjects corresponding to the plurality of areas that the distance information is obtained within the set focus range are focused in the image, and
    wherein the set focus range is defined such that a focus position corresponding to one subject among the plurality of subjects is determined as one end of the set focus range and a focus position corresponding to another subject among the plurality of subjects is determined as another end of the set focus range.

17. A non-transitory computer-readable recording medium recording a program for causing a computer to execute a control method of an image processing apparatus, the control method comprising:
    obtaining data which was captured by an image capturing apparatus, where each pixel of the data is corresponding to a light beam passed through a divided pupil region of an imaging optical system;
    obtaining distance information corresponding to a plurality of areas in the data;
    specifying focus positions corresponding to a plurality of subjects included in the data and setting a focus range determined by the specified focus positions for focusing the plurality of subjects in an image; and
    generating the image by combining pixel values in the data such that all subjects corresponding to the plurality of areas that the distance information is obtained within the set focus range are focused in the image, and
    wherein the set focus range is defined such that a focus position corresponding to one subject among the plurality of subjects is determined as one end of the set focus range and a focus position corresponding to another subject among the plurality of subjects is determined as another end of the set focus range.

18. A non-transitory computer-readable recording medium recording a program for causing a computer to execute a control method of an image processing apparatus, the control method comprising:
    outputting data from which images which are focused with a plurality of focus ranges can be generated after shooting and recording the data;
    obtaining distance information corresponding to a plurality of areas in the data;
    specifying focus positions corresponding to a plurality of subjects included in the data and setting a focus range defined by the specified focus positions for focusing the plurality of subjects in an image; and
    generating the image by combining pixel values in the data such that all subjects corresponding to the plurality of areas that the distance information is obtained within the set focus range are focused in the image, and
    wherein the set focus range is defined such that a focus position corresponding to one subject among the plurality of subjects is determined as one end of the set focus range and a focus position corresponding to another subject among the plurality of subjects is determined as another end of the set focus range.

19. An image processing apparatus comprising one or more processors configured to function as:
    a first obtaining unit which is able to obtain data from which images which are focused at a plurality of focus ranges can be generated after shooting and recording the data;
    a second obtaining unit which is able to obtain distance information corresponding to a plurality of areas in the data;
    a setting unit which is able to specify focus positions corresponding to a plurality of subjects included in the data and set a focus range determined by the specified focus positions for focusing the plurality of subjects in an image;
    an instruction unit which is able to set the plurality of subjects; and
    a generation unit which is able to generate the image by combining pixel values in the data such that all subjects corresponding to the plurality of areas that the distance information is obtained by the second obtaining unit within the focus range set by the setting unit are focused in the image, and
    wherein the focus range set by the setting unit is set such that subjects set by the instruction unit and another subject of which a focus position is between focus positions corresponding to the subjects set by the instruction unit are focused.

20. A control method of an image processing apparatus, the control method comprising:
    obtaining data from which images which are focused at a plurality of focus ranges can be generated after shooting and recording the data;
    obtaining distance information corresponding to a plurality of areas in the data;
    specifying focus positions corresponding to a plurality of subjects included in the data and setting a focus range determined by the specified focus positions for focusing the plurality of subjects in an image;
    setting the plurality of subjects; and
    generating the image by combining pixel values in the data such that all subjects corresponding to the plurality of areas that the distance information is obtained within the set focus range are focused in the image, and
    wherein the set focus range set by the setting unit is set such that set subjects and another subject of which a focus position is between focus positions corresponding to the set subjects are focused.

21. A non-transitory computer-readable recording medium recording a program for causing a computer to execute a control method of an image processing apparatus, the control method comprising:
    obtaining data from which images which are focused at a plurality of focus ranges can be generated after shooting and recording the data;
    obtaining distance information corresponding to a plurality of areas in the data;
    specifying focus positions corresponding to a plurality of subjects included in the data and setting a focus range determined by the specified focus positions for focusing the plurality of subjects in an image;
    setting the plurality of subjects;
    generating the image by combining pixel values in the data such that all subjects corresponding to the plurality of areas that the distance information is obtained within the set focus range are focused in the image, and wherein the set focus range set by the setting unit is set such that set subjects and another subject of which a focus position is between focus positions corresponding to the set subjects are focused.

22. The image processing apparatus according to claim 1, wherein the data is data which was captured by an image capturing apparatus, where each pixel of the data is corresponding to a light beam passed through a divided pupil region of an imaging optical system.

23. The image capturing apparatus according to claim 14, wherein the data is data which was captured by the imaging unit, where each pixel of the data is corresponding to a light beam passed through a divided pupil region of an imaging optical system.

24. The control method according to claim 15, wherein the data is data which was captured by the image capturing apparatus, where each pixel of the data is corresponding to a light beam passed through a divided pupil region of an imaging optical system.

25. The control method according to claim 16, wherein the data is data which was captured by the image capturing apparatus, where each pixel of the data is corresponding to a light beam passed through a divided pupil region of an imaging optical system.

26. The image processing apparatus according to claim 19, wherein the data is data which was captured by an image capturing apparatus, where each pixel of the data is corresponding to a light beam passed through a divided pupil region of an imaging optical system.

27. The control method according to claim 20, wherein the data is data which was captured by an image capturing apparatus, where each pixel of the data is corresponding to a light beam passed through a divided pupil region of an imaging optical system.

* * * * *